United States Patent Office 3,179,612
Patented Apr. 20, 1965

3,179,612
α,β-UNSATURATED CARBOXYLICESTER-SUBSTITUTED ORGANOSILICON COMPOUNDS
Edwin P. Plueddemann, Midland, Mich., assignor to Dow Corning Corporation, Midland, Mich., a corporation of Michigan
No Drawing. Filed Feb. 2, 1962, Ser. No. 170,777
14 Claims. (Cl. 260—29.2)

This invention relates to novel organosilicon compounds characterized by having attached to the silicon by C—Si bonds α,β-carboxylic unsaturated side chains.

This application is a continuation-in-part of applicant's copending application Serial No. 134,095, filed August 28, 1961, now abandoned.

It is the primary object of this invention to provide novel compositions of matter which have highly reactive internal double bonds. Another object is to provide compositions of matter which are suitable as coupling agents between solid surfaces and organic resins. Another object is to provide new compositions of matter which can be readily copolymerized with unsaturated organic monomers. Other objects and advantages will be apparent from the following description.

This invention relates to compounds of the group $$D\overset{R''}{\underset{|}{C}}=\overset{R''}{\underset{|}{C}}-\overset{O}{\underset{\|}{C}}-O-R'_a-R-\overset{R'''_b}{\underset{|}{Si}}-Y_{3-b}$$

and $$XO\overset{O}{\underset{\|}{C}}CH_2\overset{CH_2}{\underset{|}{C}}-\overset{O}{\underset{\|}{C}}O-R'_a-R-\overset{R'''_b}{\underset{|}{Si}}-Y_{3-b}$$

in which
D is of the group $$-\overset{O}{\underset{\|}{C}}OX$$

phenyl and $CH_3CH=CH-$ radicals,
X is of the group hydrocarbon groups of less than 7 carbon atoms, hydrogen and radicals of the formula $$Y_{3-b}-\overset{R'''_b}{\underset{|}{Si}}-R-R'_a-$$

each R″ is of the group hydrogen, methyl and $$-CH_2\overset{O}{\underset{\|}{C}}OX$$

where X is as above defined,
R′ is an aliphatic radical composed of carbon, hydrogen and oxygen, the latter being in the form of ether linkages or hydroxyl groups, in R′ the ratio of carbon to oxygen being not greater than 3:1,
a has a value from 0 to 1 inclusive,
R is an alkylene radical of 1 to 4 inclusive carbon atoms,
R‴ is of the group monovalent hydrocarbon radicals and monovalent halohydrocarbon radicals,
b has a value from 0 to 2 inclusive, and
Y is a monovalent hydrolyzable group.

The compositions of this invention are derivatives of itaconic acid in which the pendant olefinic group is conjugated with one unsaturated group, e.g.

$$\overset{O}{\underset{\|}{C}}-$$

and of acids in which an internal olefinic double bond is conjugated with at least two unsaturated groups. Acids having the latter configuration are maleic, fumaric, aconitic, citraconic, cinnamic, sorbic, $$HOOC\overset{CH_3}{\underset{|}{C}}=\overset{CH_3}{\underset{|}{C}}COOH$$

and $$HOOCC=CCOOH$$
$$HOOCCH_2 \quad CH_2COOH$$

The compositions of this invention are best prepared from the alkenyl esters of these acids as described below. For example, the vinyl, allyl or butenyl ester are employed and the acids can be either partially esterified or completely esterified. Thus, for example, one can use the monoallyl, diallyl or triallylester of aconitic acid.

More specifically the silanes of this invention are best prepared by reacting vinyl, allyl or butenyl esters of the above acids with silanes of the formula $$H-\overset{R'''_b}{\underset{|}{Si}}-Y_{3-b}$$

in the presence of a platinum catalyst such as chloroplatinic acid, platinum-on-charcoal or platinum-on-alumina. The reaction proceeds under the normal conditions for adding aliphatic unsaturated compounds to SiH compounds.

Those silanes shown above containing one silicon atom per molecule are best prepared by reacting one mol of $$H-\overset{R'''_b}{\underset{|}{Si}}-Y_{3-b}$$

with at least one mol of $$XO\overset{O}{\underset{\|}{C}}Q\overset{O}{\underset{\|}{C}}OR'_aR$$

or of $$D\overset{R''}{\underset{|}{C}}=\overset{R''}{\underset{|}{C}}-\overset{O}{\underset{\|}{C}}-O-R'_a-R$$

in which Q is $$-\overset{R''}{\underset{|}{C}}=\overset{R''}{\underset{|}{C}}- \quad \text{or} \quad -CH_2\overset{CH_2}{\underset{|}{C}}-$$

R is an alkenyl radical having a terminal double bond and X and D are as above defined. When X is an alkenyl radical, it is preferable that a relatively large molar excess of the ester be employed.

Those compounds having two or more silicon atoms per molecule are best prepared by reacting the dialkenyl, trialkenyl or tetraalkenyl esters of the acids with at least a molar equivalent amount (preferably more) of $$H-\overset{R'''_b}{\underset{|}{Si}}-Y_{3-b}$$

A second basic method for preparing the silanes of this invention is employed where R is a methylene radical. These compounds are best prepared by reacting a tertiary amine salt of the corresponding acids or monoesters with a compound of the formula $$ClCH_2\overset{R'''_b}{\underset{|}{Si}}-Y_{3-b}$$

The reaction can be represented by the equation, for example, $$(CH_3)_3N\cdot HOOCCH_2\overset{}{\underset{\|}{C}}COOH\cdot N(CH_3)_3 + 2ClCH_2Si(OCH_3)_3 \longrightarrow$$
$$\qquad\qquad CH_2 \qquad\qquad\qquad\qquad\qquad CH_2$$

$$(CH_3O)_3SiCH_2OOC\overset{CH_3}{\underset{\|}{C}}\overset{CH_2}{\underset{\|}{C}}COOCH_2Si(OCH_3)_3 + 2(CH_3)_3N\cdot HCl$$

The general reaction is best carried out in the presence of a mutual solvent and proceeds rapidly at temperatures of from 100° to 175° C. with the precipitation of the amine hydrochloride. In carrying out this reaction, it is essential that Y be a hydrolyzable group which is not reactive to amine salts. In other words, Y should be alkoxy or an equivalent thereof.

One can prepare methylene linked compounds having one or two silicon atoms in the molecule by adjusting the mol ratios of the tertiary amine salts and the chloromethyl silanes in the manner shown for the SiH addition reaction.

Another method of preparing compositions where R is methylene is by reacting an alkali metal salt, for example of the type $$XO\overset{O}{\underset{}{C}}Q\overset{O}{\underset{}{C}}OR'_aOM$$

with $$\underset{ClCH_2\overset{R'''_b}{\underset{|}{Si}}-Y_{3-b}}{}$$

This reaction proceeds at temperatures of 50° to 150° C. with the elimination of the alkali metal chloride, i.e., CH$_3$OOCCH=CHCOOCH$_2$CH$_2$ONa + ClCH$_2$Si(OCH$_3$)$_3$ ⟶

$$CH_3O\overset{O}{\underset{}{C}}CH=CH\overset{O}{\underset{}{C}}OCH_2CH_2OCH_2Si(OCH_3)_3 + NaCl$$

X can be hydrogen, $$Y_{3-b}\overset{R'''_b}{\underset{|}{Si}}-R-R'_a-$$

or any hydrocarbon radical of less than 7 carbon atoms such as methyl, ethyl, isopropyl, hexyl, vinyl, allyl, butenyl, phenyl, cyclohexyl or cyclopentyl.

For the purpose of this invention R can be any alkylene radical of from 1 to 4 inclusive carbon atoms such as, for example, methylene, ethylene, propylene or butylene. R can be either a straight chain radical or a branch chain radical.

The optional radical R' can be any aliphatic radical composed of carbon, hydrogen and oxygen, where the oxygen is either in the form of an ether linkage or a hydroxyl group. Thus R' can be either an ether radical such as —CH$_2$CH$_2$O—, (—CH$_2$CH$_2$O)$_5$—, (—CH$_2$CH$_2$O)$_{100}$— or —CH$_2\overset{CH_3}{\underset{|}{C}}HO$— or a hydroxylated alkylene radical such as $$-CH_2\overset{OH}{\underset{|}{C}}HCH_2-$$

or an hydroxy alkylene ether radical such as $$-CH_2\overset{OH}{\underset{|}{C}}HCH_2O-$$

For the purpose of this invention R''' can be any hydrocarbon radical such as alkyl radicals such as methyl, ethyl, isobutyl or octadecyl; any alkenyl radical such as vinyl, allyl, or hexenyl; any cycloaliphatic radical such as cyclohexyl, cyclobutyl and cyclohexenyl; any aromatic hydrocarbon radical such as phenyl, naphthyl, xenyl and tolyl and any aralkyl radical such as benzyl, beta-phenylethyl or beta-phenylpropyl. R''' can also be any halogenated hydrocarbon radical such as chloromethyl, chlorobutyl, bromophenyl, α,α,α-trifluorotolyl, trifluoropropyl, perfluorocyclohexenyl and iodophenyl.

For the purpose of this invention Y can be any monovalent hydrolyzable radical. The term "hydrolyzable radical," as employed herein, means that the Y group reacts with water under the normal conditions for hydrolyzing silanes. Thus, Y can be, for example, any halogen such as chlorine, bromine, iodine or fluorine; any group containing a silicon nitrogen bond such as Me$_2$N— or Et$_2$N—; any monovalent hydrocarbonoxy group such as methoxy, ethoxy, butoxy, isopropoxy, —OCH$_2$CH$_2$OH or radicals of the formula —(OCH$_2$CH$_2$)$_n$G where G is an aliphatic hydrocarbon radical of from 1 to 4 carbon atoms, phenoxy, cresyloxy and

—O⟨⟩OH any acyloxy group such as acetoxy, formyloxy or propionoxy; groups containing silicon, oxygen-nitrogen bonds such as Me$_2$C=NO— and Et$_2$C=NO— and any sulfate group such as $$HO\overset{O}{\underset{O}{\overset{\|}{S}}}O-,\quad MeO\overset{O}{\underset{O}{\overset{\|}{S}}}O-\quad\text{and}\quad \langle\rangle\overset{O}{\underset{O}{\overset{\|}{S}}}O-$$

It should also be understood that the hydrocarbon portions of Y can be substituted with other atoms to give, for example, groups of the formulae CF$_3$CF$_2$O—, CF$_3$COO—, Me$_2$NCH$_2$CH$_2$O—, O$_2$N⟨⟩O— and NCCH$_2$CH$_2$O—

The silanes of this invention are hydrolyzed upon contact with water. A particularly useful form of the hydrolyzates are the water-soluble silanols. These are first formed upon hydrolysis of the silanes. If the hydrolysis of the silane is carried out in a system having a pH of about 7, stable aqueous solution of these silanols are obtained. The water-soluble hydrolyzates are derived from the silanes where $b$ is 0. The precise molecular configuration of the organosilicon compound in these solutions is not precisely known. It is obviously, however, a highly hydroxylated silanol, probably a triol or a hexaol. In any event, the silicon contains a sufficient number of silicon-bonded hydroxyl groups to render the hydrolyzate water-soluble.

These aqueous solutions are particularly desirable for treating glass and other siliceous materials, since they avoid the use of inflammable or toxic solvents. These aqueous solutions of the hydrolyzate can be prepared from silanes in which Y is any of the above defined hydrolyzable groups.

The preferred silanes for making these aqueous solutions are the methoxy silanes. They hydroylze quite rapidly and produce neutral solutions. However, it is often desirable to employ dilute acetic acid solutions to hydrolyze the methoxy silane.

In those cases in which Y produces acidic or basic solutions upon hydrolysis, it is desirable to buffer the solution to bring the pH to about 7, preferably 5 to 6. This produces a stable aqueous solution which has a shelf life of several days or weeks.

The means for buffering the solution are well known in the art such as, for example, if Y is a halogen one would add the halosilane to aqueous ammonia. On the other hand, if Y is a basic group such as an amine, it is best to add the silane to a dilute solution of a weak acid such as acetic.

This invention also relates to siloxanes containing at least one siloxane unit of the formula $$XO\overset{O}{\underset{}{\overset{\|}{C}}}CH_2\overset{CH_2}{\underset{}{\overset{|}{-}}}\overset{O}{\underset{}{\overset{\|}{C}}}OR'_a-R-\overset{R'''_b}{\underset{}{\overset{|}{Si}}}-O_{\frac{3-b}{2}}$$

or $$D\overset{R''}{\underset{}{\overset{|}{C}}}=\overset{R''}{\underset{}{\overset{|}{C}}}-\overset{O}{\underset{}{\overset{\|}{C}}}-O-R'_a-R-\overset{R'''_b}{\underset{}{\overset{|}{Si}}}-O_{\frac{3-b}{2}}$$

in which X, R'', R', $a$, R, R''', D and $b$ are as above defined, any remaining siloxane units in said siloxane being of the formula $$Z_cSiO_{\frac{4-c}{2}}$$

in which Z is a monovalent hydrocarbon or monovalent halohydrocarbon radical and $c$ has an average value from 0 to 3.

The siloxanes of this invention can be either homopolymers in which each silicon has the same $$X-O-\overset{O}{\underset{}{\overset{\|}{C}}}-Q-\overset{O}{\underset{}{\overset{\|}{C}}}-O-R'_a-R-$$

or

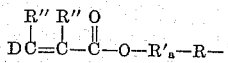

functional groups and the same R''' groups attached thereto or the siloxanes can be copolymers in which the functional groups differ in kind and/or in which the R''' groups differ in kind or in number.

The siloxanes of this invention can also be copolymers in which only some of the silicon atoms contain the novel functional groups and the remainder of the silicon atoms are either unsubstituted or contain from 1 to 3 hydrocarbon or halohydrocarbon groups attached thereto.

If we let the groups

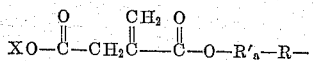

and

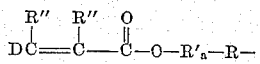

be represented by the symbol B, we can see that the siloxane units can vary as follows: $BSiO_{1.5}$, $BR'''SiO$ and $BR'''_2SiO_{.5}$ together with any combination of siloxane units of the formulae $SiO_2$, $ZSiO_{1.5}$, $Z_2SiO$ and $Z_3SiO_{.5}$, where the Z's can be the same or different hydrocarbon or halohydrocarbon radicals.

The siloxanes of this invention can be prepared by two basic methods. The first is by hydrolysis and condensation or cohydrolysis and cocondensation of the above defined silanes either alone or together with hydrolyzable silanes of the formula $Z_cSiY_{4-c}$. These hydrolyses and condensations can be carried out in the normal manner for hydrolyzing or cohydrolyzing and cocondensing siloxanes.

Alternatively, the siloxanes of this invention, whether homopolymers or copolymers, can be prepared by the above described SiH addition reaction employing platinum catalysts such as chloroplatinic acid, platinum-on-charcoal, or platinum-on-alumina. In this case, of course, the unsaturated esters are added to siloxanes containing silicon-bonded hydrogen atoms.

For the purpose of this invention Z can be any hydrocarbon radical such as alkyl radicals such as methyl, ethyl, isopropyl and octadecyl; any alkenyl radical such as vinyl, allyl or hexenyl; and cycloaliphatic hydrocarbon radical such as cyclopentyl, cyclohexyl and cyclohexenyl; any aromatic hydrocarbon radical such as phenyl, xenyl, naphthyl, tolyl or xylyl and any alkaryl hydrocarbon radicals such as benzyl, β-phenylethyl or β-phenylpropyl. Z can also be any halogenated hydrocarbon radical such as chloromethyl, chlorobutyl, bromophenyl, tetrachlorophenyl, trifluoropropyl, perfluorocyclohexenyl, α,α,α-trifluorotolyl and iodophenyl.

The siloxanes of this invention are useful for copolymerization with unsaturated organic monomers such as styrene, butadiene, vinyl chloride, vinylidene chloride and the like. The are also useful for copolymerization with other unsaturated vinylic compounds such as polyesters. The siloxanes of this invention are also useful as coating compositions either alone or when modified with organic resins and they are useful as laminating resins.

The compositions of this invention, both silanes and siloxanes, can also be used as priming agents for glass and other siliceous materials such as silica, silicates, clays and other solid materials such as metal such as aluminum, magnesium, iron and tin. These primed surfaces are organophilic in nature and are readily wettable by organic compounds. The silanes and siloxanes can be applied to the surface of the base member by any convenient method such as by brushing, dipping or spraying, and can be applied per se or in the form of aqueous or nonaqueous solutions.

The following examples are illustrative only and should not be construed as limiting the invention which is properly delineated in the appended claims.

EXAMPLE 1

A mixture of 200 ml. of purified toluene and 1 ml. of a solution of chloroplatinic acid containing 1 percent by weight platinum, was mixed and heated to 110° C. A mixture of 61 g. of trimethoxysilane and 71 g. of allyl methyl maleate was added over a period of 1½ hours at a temperature of 107° to 112° C. The mixture was then heated for one hour at 112° C. The toluene was removed by distillation and the residue was distilled to obtain a material boiling at 137° C. at 4 mm. having a $n_D^{25}$ 1.4392. This material had the Formula I

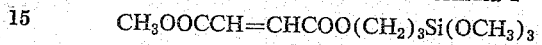

EXAMPLE 2

A mixture of 250 cc. of toluene, .4 g. of 2,5-ditertiarybutylhydroquinone and 1 g. of 1 percent platinum dispersed on alumina was stirred and heated to 110° C. as a mixture of 183 g. of trimethoxysilane and 196.2 g. of diallyl maleate was added dropwise to the toluene. The addition was carried out over a period of 24 hours and the product stirred for an additional 48 hours. At the end of this time, the temperature was 118° C. The remaining mixed reactants were then added over a one hour period and the reaction temperature dropped to 112° C. The mixture was then stirred and heated for an additional 5½ hours. The solvent and unreacted materials were removed by distillation and the product was distilled to give the compound II

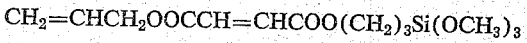

boiling at 115° to 125° C. at 2 mm. The residue was the compound III

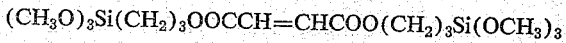

Both of the above compounds were the cis-isomers.

EXAMPLE 3

A mixture of 196 g. of diallyl fumarate, .5 g. of 2,5-ditertiarybutylhydroquinone and 10 drops of a 1 percent solution of platinum in the form of chloroplatinic acid in dimethylphthalate were mixed and heated to 130° C. Then 195 g. of trimethoxysilane was added dropwise over a two hour period. The temperature at this time was 110° C. The reactants were then heated for 5 hours at 120° C. The product was stripped of solvent and there was obtained the compound IV

and the compound V

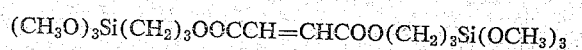

Both of these compounds were the trans-isomer.

EXAMPLE 4

A mixture of 200 ml. of purified toluene, 1 ml. of 1 percent platinum solution and 46.8 g. of monoallyl maleate was heated to 105° C. and 49 g. of trimethoxysilane was added dropwise. The reactants were then heated 3 hours at 93° C. A white soluble mass of crystals was obtained. The solvent and unreacted starting materials was removed and the product was distilled to give a material boiling at 112° C. at 2 mm. which was the compound VI

EXAMPLE 5

A mixture of 52.5 g. of diallyl itaconate and 30.5 g. of trimethoxysilane was added to a refluxing solution of 50 ml. toluene, .1 g. of hydroquinone, .3 g. of N,N'-diphenyl-p-phenylenediamine and .5 g. of 1 percent platinum solution. The reactants were then heated at 110° to 114° C. for 45 minutes. After cooling .1 g. of N,N'-diphenyl-p-phenylenediamine and .3 g. of hydroquinone were added and the product was distilled to give the compounds VII

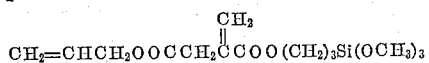

and VIII

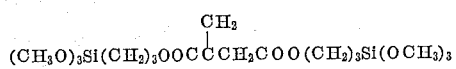

Actually VII is a mixture of the isomers VII and

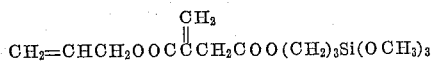

EXAMPLE 6

A mixture of 145 g. of methylene chloride and 145 g. of bis-gamma-trichlorosilylpropyl fumarate was heated to reflux at 41° C. and 59.5 g. of methanol was added dropwise over a 2 hour period. The mixture was then heated for 30 minutes at 40 to 45° C. 10.6 g. of methylorthoformate was added and the mixture was heated an additional 30 minutes at 45° to 50° C. The product was distilled to give IX

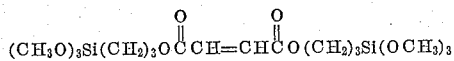

boiling 110° to 115° C. at 1 mm. and having an $n_D^{25}$ of 1.4440.

EXAMPLE 7

A mixture of 47 g. of allyl cinnamate and 10 drops of a 1 percent solution of chloroplatinic acid in the dimethylether of ethylene glycol was heated to 100° C. and agitated while 31 g. of trimethoxy silane was slowly added. The mixture was then heated 4 hours at 100° to 120° C. and was thereafter distilled to give X $$C_6H_5CH=CHCOO(CH_2)_3Si(OCH_3)_3$$

This product had the following properties: $D^{23°\ C.}$ 1.104 and $n_D^{25}$ 1.5165.

When this silane is hydrolyzed the siloxane of the unit formula $C_6H_5CH=CHCOO(CH_2)_3SiO_{1.5}$ is obtained.

EXAMPLE 8

Allyl sorbate was prepared by refluxing a mixture of 112 g. of sorbic acid, 70 g. of allyl alcohol, 1 g. of hydroquinone and 1 g. of $H_2SO_4$ acid for 2 hours while removing water.

76 g. of the resulting allyl sorbate was mixed with 5 drops of the catalyst of Example 7 and warmed to 80° to 90° C. while slowly adding 49 g. of trimethoxysilane. The mixture was heated briefly to 150° C. The product gave a negative test for SiH when mixed with alcoholic mercuric chloride.

The product was distilled and there was obtained XI $$CH_3CH=CHCH=CHCOO(CH_2)_3Si(OCH_3)_3$$

A 10 percent solution of this silane in aqueous isopropanol was diluted to 1 percent with water, it gave a hazy aqueous solution.

The hydrolyzate of this silane had the unit formula $CH_3CH=CHCH=CHCOO(CH_2)_3SiO_{1.5}$.

EXAMPLE 9

42 g. of diallylcitraconate was mixed with 10 drops of the catalyst of Example 7 and .1 g. of hydroquinone. The mixture was warmed to 70° to 80° C. while 24 g. of trimethoxysilane was slowly added. The mixture was warmed briefly to 160° C. and distilled to give XII

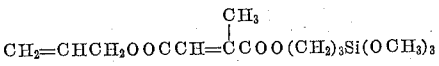

which had the following properties: $D^{25°\ C.}$ 1.108 and $n_D^{25}$ 1.4521. This product was actually a mixture of isomers, one of which has the configuration XII and the other has the configuration

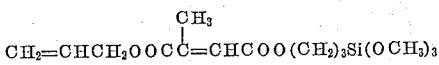

The second fraction obtained was the compound XIII

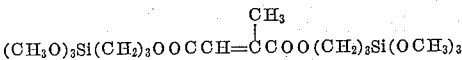

When these silanes are hydrolyzed, siloxanes of the unit formulae

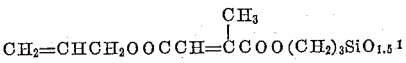

and

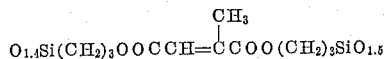

are obtained.

EXAMPLE 10

45 g. (.15 m) of triallyl aconitate was mixed with 5 drops of the catalyst of Example 7 and .1 g. of phenyl-β-naphthylamine and warmed to 80° to 100° C. while slowly adding 18 g. (.15 m) of trimethoxysilane. The mixture was warmed to 140° C. until no SiH remained. The product was stripped to obtain XIV

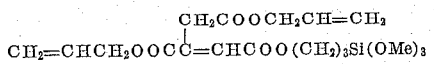

The experiment was repeated except that 50 g. (.17 m) of triallylaconitate was reacted with 70 g. (.57 m) of trimethoxysilane. The resulting product was XV

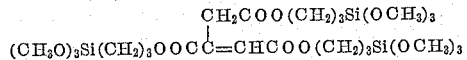

Both of the above silanes were soluble in water. When these materials are hydrolyzed, siloxanes of the following unit formulae are obtained:

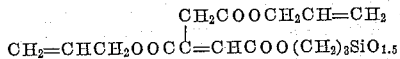

and

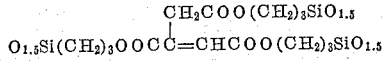

EXAMPLE 11

The utility of the compositions of this invention for improving the adhesion of polyester resins to glass is shown in this example. This example shows the utility of the materials for treating the glass and thereafter forming the laminate and also for adding the composition to the polyester resin without first treating the glass. The example also shows the utility of both the silanes (employed in organic solvents) and the water-soluble hydrolyzates (employed in aqueous solution).

The glass employed in this example was heat-cleaned 181 glass cloth. Each of the laminates was prepared by stacking 14 plies of the glass cloth (laid up with the warp threads rotated 90° in the alternate plies), impregnated with the polyester resin described below, the laminate was cured 30 minutes at 30 p.s.i. and 100° C. to form a molded sheet having a thickness of about 120 mils and containing about 30 percent by weight of the cured polyester resin based on the weight of the glass.

---

[1] Mixed isomers.

The resin employed was a solution of 70 parts linear polyester in 30 parts styrene monomer, to which had been added .5 part of benzoyl peroxide dissolved in about 7.5 parts styrene monomer. The linear polyester was one prepared from phthalic acid and maleic acid in equal molar proportions reacted with propylene glycol in such amount that the 70 percent solution of this polyester in styrene had an acid number of about 35.

The flexural strength of the laminates was determined in accordance with U.S. Federal Specification L-P 406b, Method 1031, and the compressive strength was determined in accordance with Method 1021 of the same specification. The flexural strength was also determined after a sample of each laminate had been boiled in water for two hours, then cooled to room temperature and wiped dry. The results of the latter test are referred to in the table below as the "two hour boil." The two hour boil flexural strength times 100 divided by the strength of the laminate as molded is the percent retention.

In the table below the percent concentration has reference to the percent by weight of the composition based upon the weight of the solvent or based upon the weight of the polyester resin as the composition was first added to the resin.

hours. The mixture was held at reflux over this period. The product was distilled to give (1) 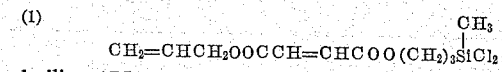

boiling 175° C. at 5 mm.; $d_4^{25}$ 1.173, and (2) 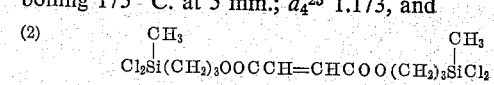

boiling at 220° C. at 5 mm.

The first compound above was dissolved in toluene and mixed with ice water. A fluid siloxane having a viscosity of 650 cs. and having the unit formula

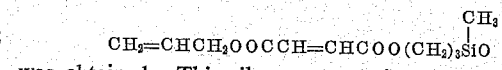

was obtained. This siloxane was mixed with .5 percent by weight ditertiarybutylperoxide and heated to 120° C. overnight. It polymerized to a clear hard insoluble nonfusible casting.

62 g. of compound (1), 38 g. of phenylmethyldichlorosilane and 100 ml. of toluene were mixed and added to 150 ml. of water. The mixture was stirred one hour, separated and the toluene solution washed with water and dried over $K_2CO_3$. The solvent was evaporated and the residue was a clear fluid copolymer having a viscosity of

*Table I*

| Compound | Applied as | Conc. in percent by wt. | Flexural strength in p.s.i. As molded | Flexural strength in p.s.i. 2 hr. boil | Compressive strength in p.s.i. | Percent retention |
|---|---|---|---|---|---|---|
| I | Water solution of hydrolyzate | 0.5 | 79,800 | 77,500 | 33,800 | 97 |
| II | I added to polyester resin | 1.0 | 85,000 | 71,500 | 45,500 | 84 |
| III | Toluene solution | 0.5 | 74,200 | 65,000 | 30,000 | 88 |
| IV | do | 0.5 | 83,500 | 77,600 | 44,400 | 93 |
| V | do | 0.5 | 82,100 | 70,100 | 42,500 | 85 |
| VI | do | 0.5 | 79,200 | 78,300 | 52,500 | 99 |
| VII | Water solution of hydrolyzate | 0.5 | 65,200 | 62,700 | 29,800 | 96 |
| VIII | do | 0.5 | 89,600 | 84,800 | 50,300 | 95 |
| | do | 0.5 | 84,600 | 69,400 | 46,800 | 83 |
| IX | Toluene-acetone solution | 0.5 | 76,200 | 70,200 | 39,500 | 92 |
| X | Water solution of hydrolyzate | 0.5 | 88,000 | 79,200 | 51,300 | 90 |
| XI | Toluene-acetone solution | .05 | 79,800 | 74,800 | 44,100 | 94 |
| XII | Water | .05 | 97,400 | 89,500 | 52,900 | 91 |
| XIII | do | .05 | 53,900 | 66,800 | 29,300 | |
| | do | .05 | 59,500 | 51,600 | 29,400 | 86.5 |
| XIV | Toluene acetone | .05 | 83,200 | 78,300 | 39,600 | 88 |
| XV | Water | .05 | 70,100 | 66,600 | 42,000 | 94 |

EXAMPLE 12

200 g. of diallyl fumarate was mixed with 20 drops of one percent Pt as chloroplatinic acid in methyl cellosolve and heated as 200 g. of dimethylmonochlorosilane was added at reflux temperature over a period of eight hours. The product was distilled to give $$CH_2=CHCH_2OOCCH=CHCOO(CH_2)_3\overset{(CH_3)_2}{\underset{|}{Si}}Cl$$

boiling 155° C. at 3 mm.; $d_4^{25}$ 1.087 and

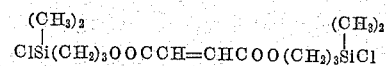

boiling 190° to 195° C. at 1 mm.; $d_4^{24}$ 1.098.

The latter product was hydrolyzed with water to give the siloxane of the unit formula

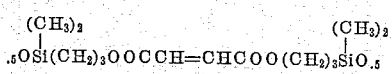

EXAMPLE 13

200 g. of diallyl fumarate was mixed with 15 drops of the Pt catalyst of Example 12 and heated as 160 ml. of methyldichlorosilane was added over a period of 1.25

1180 cs. at 25° C. This was a copolymer of 50 mol percent

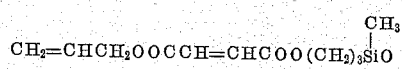

and 50 mol percent phenylmethylsiloxane.

This copolymer alone and mixed with the following monomers in the proportions shown below were each mixed with .5 percent by weight tertiarybutylperbenzoate and heated overnight at 65° C. and then cured overnight at 125° to 130° C. The properties are shown in the table below:

*Table II*

| Percent by wt. monomer based on wt. of copolymer+monomer | Barcol hardness | Toluene resistance |
|---|---|---|
| 10% styrene | 35 | OK |
| 33% styrene | 34 | OK |
| 50% styrene | 30 | OK |
| 33% diallylphthalate | 28 | Fair |
| | 42 | OK |

EXAMPLE 14

When the following silanes are reacted with the following esters in accordance with the procedure of Example 3, the following products are obtained:

Table III

| Silane | Ester | Product |
|---|---|---|
| HSi(Oi-C$_3$H$_7$)$_3$ | C$_6$H$_{11}$OOCCH=CHCOOCH$_2$C(CH$_3$)=CH$_2$ | C$_6$H$_{11}$OOCCH=CHCOOCH$_2$CH(CH$_3$)CH$_2$Si(Oi-C$_3$H$_7$)$_3$ |
| HSi(OOCCH$_3$)$_2$(CH$_3$) | HOOCCH=CHCOO(CH$_2$CH$_2$O)$_{100}$CH=CH$_2$ | HOOCCH=CHCOO(CH$_2$CH$_2$O)$_{100}$(CH$_2$)$_2$Si(OOCCH$_3$)$_2$(CH$_3$) |
| HSi(OCH$_2$CH$_2$OCH$_3$)$_2$(C$_6$H$_5$) | HOOCCH=CHCOOCH$_2$CH$_2$CH=CH$_2$ | HOOCCH=CHCOO(CH$_2$)$_4$Si(OCH$_2$CH$_2$OCH$_3$)$_2$(C$_6$H$_5$) |
| HSiCl(CH$_3$)$_2$ | CH$_3$OOCCH=CHCOOCH$_2$CH=CH$_2$ | CH$_3$OOCCH=CHCOO(CH$_2$)$_3$Si(CH$_3$)$_2$-Cl |
| HSi[ON=C(CH$_3$)$_2$]$_3$ | CH$_3$OOCCH=CHCOOCH$_2$CH=CH$_2$ | CH$_3$OOCCH=CHCOO(CH$_2$)$_3$Si[ON=C(CH$_3$)$_2$]$_3$ |
| HSi[N(CH$_3$)$_2$]$_2$(C$_6$H$_{11}$) | CH$_3$OOCCH=CHCOOCH$_2$CH=CH$_2$ | CH$_3$OOCCH=CHCOO(CH$_2$)$_3$Si[N(CH$_3$)$_2$]$_2$(C$_6$H$_{11}$) |
| HSi(OCH$_2$CH$_2$Cl)$_2$(C$_{18}$H$_{37}$) | CH$_3$OOCCH=CHCOOCH$_2$CH=CH$_2$ | CH$_3$OOCCH=CHCOO(CH$_2$)$_3$Si(OCH$_2$CH$_2$Cl)$_2$(C$_{18}$H$_{37}$) |
| HSi(OOC-C$_6$H$_3$-NO$_2$)$_2$(CH$_2$CH$_2$CF$_3$) | CH$_3$OOCCH=CHCOOCH$_2$CH=CH$_2$ | CH$_3$OOCCH=CHCOO(CH$_2$)$_3$Si(OOC-C$_6$H$_3$-NO$_2$)$_2$(CH$_2$CH$_2$CF$_3$) |
| HSiO(C$_6$H$_4$Cl)(C$_6$H$_5$)(C$_2$H$_5$) | CH$_3$OOCCH=CHCOOCH$_2$CH=CH$_2$ | CH$_3$OOCCH=CHCOO(CH$_2$)$_3$Si(C$_6$H$_4$Cl)—O—(C$_6$H$_5$)(C$_2$H$_5$) |
| HSiO(CH$_2$CH$_2$O)$_5$H(CH$_3$)$_2$ | CH$_3$OOCCH=CHCOOCH$_2$CH=CH$_2$ | CH$_3$OOCCH=CHCOO(CH$_2$)$_3$SiO(CH$_2$CH$_2$O)$_5$H(CH$_3$)$_2$ |
| HSi(OCH$_3$)$_3$ | CH$_2$=CHCH$_2$OOCCH$_2$<br>CH$_2$=CHCH$_2$OOCC=CCOOCH$_2$CH=CH$_2$<br>CH$_2$COOCH$_2$CH=CH$_2$ | (CH$_3$O)$_3$Si(CH$_2$)$_3$OOCCH$_2$<br>(CH$_3$O)$_3$Si(CH$_2$)$_3$OOCC=CCOO(CH$_2$)$_3$Si(OCH$_3$)$_3$<br>CH$_2$COO(CH$_2$)$_3$Si(OCH$_3$)$_3$ |
| HSi(OCH$_3$)$_3$ | CH$_3$OOCCH$_2$<br>CH$_3$OOCC=CHCOOCH$_2$CH=CH$_2$ | CH$_3$OOCCH$_2$<br>CH$_3$OOCC=CHCOO(CH$_2$)$_3$Si(OCH$_3$)$_3$ |

EXAMPLE 15

When the products of Example 14 are hydrolyzed by mixing them with water having a pH of 6 or less, polysiloxanes having the unit formulae are obtained:

C$_6$H$_{11}$OOCCH=CHCOOCH$_2$CH(CH$_3$)CH$_2$SiO$_{1.5}$

HOOCCH=CHCOO(CH$_2$CH$_2$O)$_{100}$(CH$_2$)$_2$SiO(CH$_3$)

HOOCCH=CHCOO(CH$_2$)$_4$SiO(C$_6$H$_5$)

CH$_3$OOCCH=CHCOO(CH$_2$)$_3$SiO$_{0.5}$(CH$_3$)$_2$

CH$_3$OOCCH=CHCOO(CH$_2$)$_3$SiO$_{1.5}$

CH$_3$OOCCH=CHCOO(CH$_2$)$_3$SiO(C$_6$H$_{11}$)

CH$_3$OOCCH=CHCOO(CH$_2$)$_3$SiO(C$_{18}$H$_{37}$)

CH$_3$OOCCH=CHCOO(CH$_2$)$_3$SiO(CH$_2$CH$_2$CF$_3$)

CH$_3$OOCCH=CHCOO(CH$_2$)$_3$SiO$_{0.5}$(C$_6$H$_4$Cl)(C$_2$H$_5$)

CH$_3$OOCCH=CHCOO(CH$_2$)$_3$SiO$_{0.5}$(CH$_3$)$_2$

O$_{1.5}$Si(CH$_2$)$_3$OOCCH$_2$
O$_{1.5}$Si(CH$_2$)$_3$OOCC=CCOO(CH$_2$)$_3$SiO$_{1.5}$
CH$_2$COO(CH$_2$)$_3$SiO$_{1.5}$

CH$_3$OOCCH$_2$
CH$_3$OOCC=CHCOO(CH$_2$)$_3$SiO$_{1.5}$

EXAMPLE 16

When the following siloxanes are reacted with the following esters the following products are obtained. The reaction is carried out by heating the mixed reactants in contact with a small amount of chloroplatinic acid.

3,179,612

Table IV

| Siloxane | Ester | Product |
|---|---|---|
| I.... $(CH_3)_2(CH_3)_2$<br>$HSi[OSi]_{10,000}OSi(CH_3)_3$ | $CH_3OOCCH=$<br>$CHCOOCH_2CH=CH_2$ | $(CH_3)_2(CH_3)_2$<br>$CH_3OOCCH=CHCOO(CH_2)_3Si[OSi]_{10,000}OSi(CH_3)_3$ |
| II.... $(CH_3)_2$<br>$Si[OSiH]_4$ | $CH_3OOCCH=$<br>$CHCOOCH_2CH=CH_2$ | $(CH_3)_2$<br>$Si[OSi(CH_2)_3OOCCH=CHCOOCH_3]_4$ |
| III... A copolymer of 1 mol percent $HSiO_{1.5}$<br>90 mol percent $Cl\langle\rangle\overset{CH_3}{\underset{}{Si}}O$<br>9 mol percent $C_6H_5SiO_{1.5}$ | $CH_3OOCCH=$<br>$CHCOOCH_2CH=CH_2$ | Copolymer of 1 mol percent<br>$CH_3OOCCH=CHCOO(CH_2)_3SiO_{1.5}$<br>90 mol percent $Cl\langle\rangle\overset{CH_3}{\underset{}{Si}}O$<br>9 mol percent $C_6H_5SiO_{1.5}$ |
| IV... $(CH_3)_3Si[O\overset{CH_3}{\underset{H}{Si}}]_4OSi(CH_3)_3$ | $CH_3OOCCH=$<br>$CHCOOCH_2CH=CH_2$ | $(CH_3)_3Si\left[O\overset{CH_3}{\underset{(CH_2)_3OOCCH=CHCOOCH_3}{Si}}\right]_4OSi(CH_3)_3$ |
| V.... Copolymer of 5 mol percent $(CH_3)HSiO$<br>50 mol percent $CH_3SiO_{1.5}$<br>45 mol percent $C_6H_5SiO_{1.5}$ | $CH_3OOCCH=$<br>$CHCOOCH_2CH=CH_2$ | 5 mol percent $CH_3OOCCH=CHCOO(CH_2)_3Si\overset{CH_3}{\underset{}{}}O$<br>50 mol percent $CH_3SiO_{1.5}$<br>45 mol percent $C_6H_5SiO_{1.5}$ |
| VI... Copolymer of 1 mol percent $(CH_3)HSiO$<br>20 mol percent $C_{18}H_{37}\overset{CH_3}{\underset{}{Si}}O$<br>20 mol percent $C_6H_{11}SiO_{1.5}$<br>20 mol percent $\langle\rangle\langle\rangle SiO_{1.5}$<br>20 mol percent $\langle\rangle\overset{CH_3}{\underset{}{C}}H\overset{CH_3}{\underset{}{C}}H_2\overset{}{\underset{}{Si}}O$<br>19 mol percent $CF_3CH_2CH_2\overset{CH_3}{\underset{}{Si}}O$ | $CH_3OOCCH=$<br>$CHCOOCH_2CH=CH_2$ | 1 mol percent $CH_3OOCCH=CHCOO(CH_2)_3\overset{CH_3}{\underset{}{Si}}O$<br>20 mol percent $C_{18}H_{37}\overset{CH_3}{\underset{}{Si}}O$<br>20 mol percent $C_6H_{11}SiO_{1.5}$<br>20 mol percent $\langle\rangle\langle\rangle SiO_{1.5}$<br>20 mol percent $\langle\rangle\overset{CH_3}{\underset{}{C}}H\overset{CH_3}{\underset{}{C}}H_2\overset{}{\underset{}{Si}}O$<br>19 mol percent $CF_3CH_2CH_2\overset{CH_3}{\underset{}{Si}}O$ |

EXAMPLE 17

$CH_3SiCl_3$ was chlorinated to produce $ClCH_2SiCl_3$. The latter was reacted with methanol to give $ClCH_2Si(OCH_3)_3$. When a solution of 2 mols of triethylamine, 1 mol itaconic acid and 2 mols of $ClCH_2Si(OCH_3)_3$, 15 parts hydroquinone, and 300 parts xylene is heated at reflux for 16 hours, filtered and the solvent removed, the product $$(CH_3O)_3SiCH_2OOC\overset{CH_2}{\underset{\|}{C}}CH_2COOCH_2Si(OCH_3)_3$$

is obtained.

EXAMPLE 18

When 1 mol of $$CH_3OOCCH=CHCOO(C_2H_4O)_3(C_3H_6O)_2H$$

is dissolved in ethyleneglycoldimethylether and mixed with .1 g. of hydroquinone and 10 drops of stannic chloride is added and then one mol of

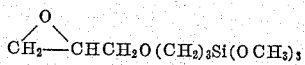

is added and the mixture is cooled on a water bath held at 20° C. and the mixture then allowed to stand for 3 hours, the product

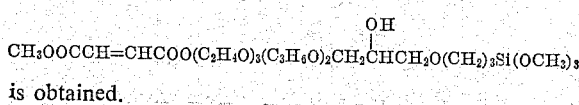

is obtained.

EXAMPLE 19

When one mol of $CH_3OOCCH=CHCOOH$ is reacted with one mol of

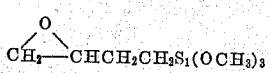

in the presence of a catalytic amount of tributylamine at 100° C. the compound

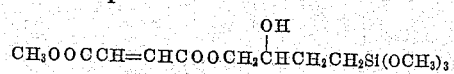

is obtained.

EXAMPLE 20

A mixture of 196 g. of diallyl fumarate, 2 g. of hydroquinone and 2 g. of 1 percent Pt added as a solution of $H_2PtCl_6$ in dimethylphthalate was heated to 95° C. and 298 g. of trichlorosilane was added dropwise over a 2 hour period. The mixture was heated an additional 15 minutes at 95° C. The mixture was cooled to room temperature and 2 g. of hydroquinone and .1 g. of sulfur were added and the mixture was distilled. There was obtained the product

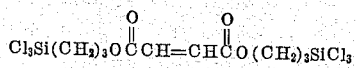

boiling 196° to 199° C. at 1 mm.

EXAMPLE 21

When the following silanes are reacted with the following esters in accordance with the procedure of Example 7, the following products are obtained:

Table V

| Silane | Ester | Product |
|---|---|---|
| $HSi(Oi\text{-}C_3H_7)_3$ | $HOOCCH_2\overset{CH_2}{\underset{\|}{C}}COOC_3H_5$ | $HOOCCH_2\overset{CH_2}{\underset{\|}{C}}COO(CH_2)_3Si(Oi\text{-}C_3H_7)_3$ |
| $\overset{CH_3}{\underset{\|}{H Si}}(OOCCH_3)_2$ | $\bigcirc\!\!-\!\!OOCCH_2\overset{CH_2}{\underset{\|}{C}}COO(C_2H_4O)_5C_3H_5$ | $\bigcirc\!\!-\!\!OOCCH_2\overset{CH_2}{\underset{\|}{C}}COO(C_2H_4O)_5(CH_2)_3\overset{CH_3}{\underset{\|}{Si}}(OOCCH_3)_2$ |
| $HSi(OCH_2CH_2OCH_3)_2\;\bigcirc\!\!-\!\!$ | $CH_3OOCCH_2\overset{CH_2}{\underset{\|}{C}}COOC_2H_4OC_2H_3$ | $CH_3OOCCH_2\overset{CH_2}{\underset{\|}{C}}\!\!-\!\!COOC_2H_4O(CH_2)_2Si(OCH_2CH_2OCH_3)_2\;\bigcirc\!\!-\!\!$ |
| $\overset{CH_3}{\underset{\underset{C_2H_3}{\|}}{HSiCl}}$ | $CH_3OOCCH_2\overset{CH_2}{\underset{\|}{C}}COOC_3H_5$ | $CH_3OOCCH_2\overset{CH_2}{\underset{\|}{C}}COO(CH_2)_3\overset{CH_3}{\underset{\underset{C_2H_3}{\|}}{SiCl}}$ |
| $HSi[ON\!\!=\!\!C(CH_3)_2]_3$ | $CH_3OOCCH_2\overset{CH_2}{\underset{\|}{C}}COOC_3H_5$ | $CH_3OOCCH_2\overset{CH_2}{\underset{\|}{C}}COO(CH_2)_3Si[ON\!\!=\!\!C(CH_3)_2]_3$ |
| $\overset{C_6H_{11}}{\underset{\|}{HSi}}[N(CH_3)_2]_2$ | $CH_3OOCCH_2\overset{CH_2}{\underset{\|}{C}}COOC_3H_5$ | $CH_3OOCCH_2\overset{CH_2}{\underset{\|}{C}}COO(CH_2)_3\overset{C_6H_{11}}{\underset{\|}{Si}}[N(CH_3)_2]_2$ |
| $\overset{C_{18}H_{37}}{\underset{\|}{HSi}}(OCH_2CH_2Cl)_2$ | $CH_3OOCCH_2\overset{CH_2}{\underset{\|}{C}}COOC_3H_5$ | $CH_3OOCCH_2\overset{CH_2}{\underset{\|}{C}}COO(CH_2)_3\overset{C_{18}H_{37}}{\underset{\|}{Si}}(OCH_2CH_2Cl)_2$ |
| $\overset{CH_2CH_2CF_3}{\underset{\|}{HSi}}(OOC\!\!-\!\!\bigcirc\!\!-\!\!NO_2)_2$ | $CH_3OOCCH_2\overset{CH_2}{\underset{\|}{C}}COOC_3H_5$ | $CH_3OOCCH_2\overset{CH_2}{\underset{\|}{C}}COO(CH_2)_3\overset{CH_2CH_2CF_3}{\underset{\|}{Si}}(OOC\!\!-\!\!\bigcirc\!\!-\!\!NO_2)_2$ |
| $\overset{Cl\!-\!\bigcirc\!-}{\underset{\underset{C_2H_5}{\|}}{HSiO}}$ | $CH_3OOCCH_2\overset{CH_2}{\underset{\|}{C}}COOC_3H_5$ | $CH_3OOCCH_2\overset{CH_2}{\underset{\|}{C}}COO(CH_2)_3\overset{Cl\!-\!\bigcirc\!-}{\underset{\underset{C_2H_5}{\|}}{SiO}}$ |
| $\overset{(CH_3)_2}{\underset{\|}{HSiO}}(CH_2CH_2O)_5H$ | $CH_3OOCCH_2\overset{CH_2}{\underset{\|}{C}}COOCH_2\overset{OH}{\underset{\|}{C}}HCH_2OC_2H_5$ | $CH_3OOCCH_2\overset{CH_2}{\underset{\|}{C}}COOCH_2\overset{OH}{\underset{\|}{C}}HCH_2O(CH_2)_3\overset{(CH_3)_2}{\underset{\|}{SiO}}(CH_2CH_2O)_5H$ |

EXAMPLE 22

When the products of Example 21 are hydrolyzed by mixing them with water having a pH of 6 or less, polysiloxanes having the following unit formulae are obtained:

$$HOOCCH_2\overset{CH_2}{\underset{\|}{C}}COO(CH_2)_3SiO_{1.5}$$

$$\bigcirc\!\!-\!\!OOCCH_2\overset{CH_2}{\underset{\|}{C}}COO(C_2H_4O)_5(CH_2)_3\overset{CH_3}{\underset{\|}{Si}}O$$

$$CH_3OOCCH_2\overset{CH_2}{\underset{\|}{C}}COOC_2H_4O(CH_2)_2SiO$$

$$CH_3OOCCH_2\overset{CH_2}{\underset{\|}{C}}COO(CH_2)_3\overset{CH_3}{\underset{\underset{C_2H_3}{\|}}{SiO_{0.5}}}$$

$$CH_3OOCCH_2\overset{CH_2}{\underset{\|}{C}}COO(CH_2)_3SiO_{1.5}$$

$$CH_3OOCCH_2\overset{CH_2}{\underset{\|}{C}}OO(CH_2)_3\overset{C_6H_{11}}{\underset{\|}{Si}}O$$

$$CH_3OOCCH_2\overset{CH_2}{\underset{\|}{C}}COO(CH_2)_3\overset{C_{18}H_{37}}{\underset{\|}{Si}}O$$

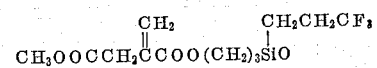

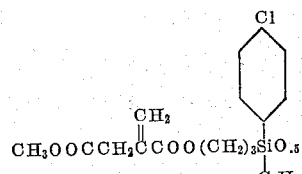

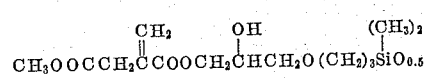

That which is claimed is:
1. A silane of the formula selected from the group consisting of

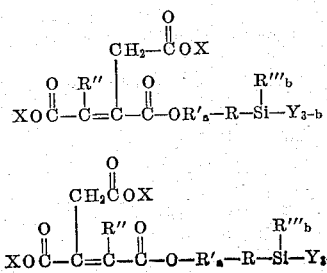

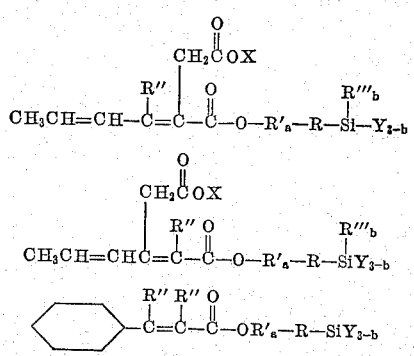

and

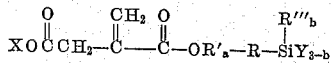

in which

X is selected from the group consisting of hydrocarbon radicals of less than 7 carbon atoms, hydrogen and radicals of the formula

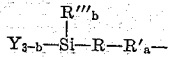

each R″ being selected from the group consisting of hydrogen, methyl and

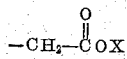

where X is as above defined,

R′ is an aliphatic radical composed of carbon, hydrogen and oxygen, the latter being in the form of configurations selected from the group consisting of ether linkages and hydroxyl radicals, in R′ the ratio of carbon to oxygen being not greater than 3:1, R is an alkylene radical of 1 to 4 inclusive carbon atoms, R″ is selected from the group consisting of monovalent hydrocarbon radicals and monovalent halohydrocarbon radicals, Y is a monovalent hydrolyzable group, $a$ has a value from 0 to 1 inclusive and $b$ has a value of 0 to 2 inclusive.

2. An aqueous solution of at least one of the hydrolyzates of the silanes of claim 1.

3. A siloxane containing at least one siloxane unit selected from the group consisting of

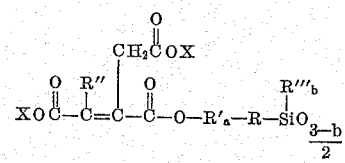

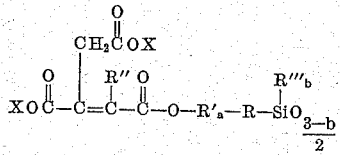

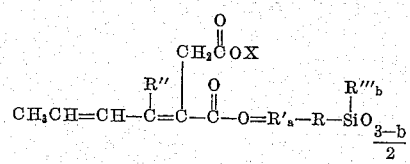

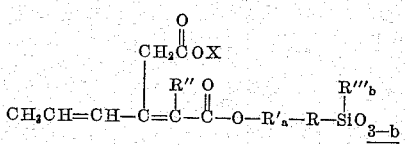

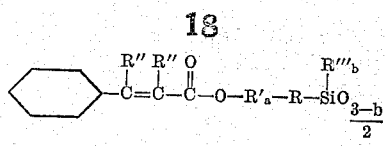

and

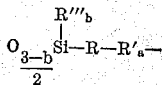

in which

X is selected from the group consisting of hydrocarbon radicals of less than 7 carbon atoms, hydrogen and radicals of the formula

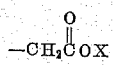

each R″ being selected from the group consisting of hydrogen, methyl and $$-CH_2\overset{O}{\overset{\|}{C}}OX$$

radicals where X is as above defined,

R′ is an aliphatic radical composed of carbon, hydrogen and oxygen, the latter being in the form of configurations selected from the group consisting of ether linkages and hydroxyl radicals, in R′ the ratio of carbon to oxygen being not greater than 3:1, R is an alkylene radical of 1 to 4 inclusive carbon atoms, R‴ is selected from the group consisting of monovalent hydrocarbon radicals and monovalent halohydrocarbon radicals, $a$ has a value from 0 to 1 inclusive and $b$ has a value from 0 to 2 inclusive, any remaining siloxane units in said siloxane being of the formula

in which

Z is selected from the group consisting of monovalent hydrocarbon radicals and monovalent halohydrocarbon radicals and $c$ has an average value from 0 to 3 inclusive.

4. A silane of the formula

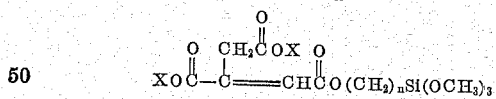

where X is a hydrocarbon radical of less than 7 carbon atoms and $n$ has a value from 2 to 4 inclusive.

5. A silane of the formula

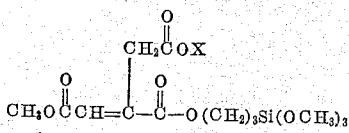

where X is a hydrocarbon radical of less than 7 carbon atoms.

6.

$$(CH_3O)_3Si(CH_2)_n-O-\overset{O}{\overset{\|}{C}}-\overset{CH_3}{\overset{|}{C}}=\overset{\overset{\displaystyle CH_2\overset{O}{\overset{\|}{C}}OX}{|}}{C}-\overset{O}{\overset{\|}{C}}-O(CH_2)_nSi(OCH_3)_3$$

in which $n$ has a value from 2 to 4 inclusive and X is a hydrocarbon radical of less than 7 carbon atoms.

7. A silane of the formula

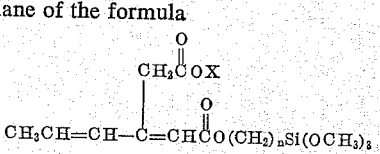

in which $n$ has a value from 2 to 4 inclusive and X is a hydrocarbon radical of less than 7 carbon atoms.

8. A silane of the formula

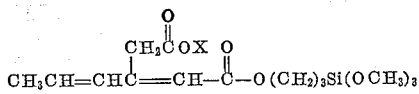

where X is a hydrocarbon radical of less than 7 carbon atoms.

9. A silane of the general formula

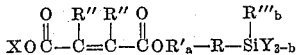

in which

X is a hydrocarbon radical of less than 7 carbon atoms,
R″ being selected from the group consisting of hydrogen and methyl,
R′ is an aliphatic radical composed of carbon, hydrogen and oxygen, the latter being in the form of configurations selected from the group consisting of ether linkages and hydroxyl radicals, in R′ the ratio of carbon to oxygen being not greater than 3:1,
R is an alkylene radical of 1 to 4 inclusive carbon atoms,
R‴ is selected from the group consisting of monovalent hydrocarbon radicals and monovalent halohydrocarbon radicals,
Y is a monovalent hydrolyzable group,
$a$ has a value from 0 to 1 inclusive and $b$ has a value of 0 to 2 inclusive.

10. An aqueous solution of at least one of the hydrolyzates of the silanes of claim 9.

11.

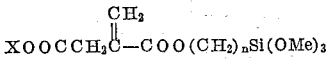

in which X is a hydrocarbon radical of less than 7 carbon atoms and $n$ has a value from 2 to 4 inclusive.

12.

$$CH_2=CHCH_2OOCCH_2\overset{CH_2}{\underset{\|}{C}}COO(CH_2)_3Si(OMe)_3$$

13.

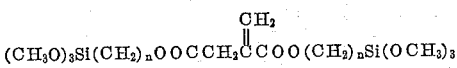

in which $n$ has a value from 2 to 4.

14.

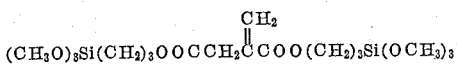

References Cited by the Examiner
UNITED STATES PATENTS

| | | | |
|---|---|---|---|
| 2,770,632 | 11/56 | Merker | 260—448.2 |
| 2,823,218 | 2/58 | Speier et al. | 260—448.2 |
| 2,833,802 | 5/58 | Merker | 260—448.2 |
| 2,898,361 | 8/59 | Barnes | 260—448.2 |
| 2,906,735 | 9/59 | Speier | 260—448.2 |
| 2,922,806 | 1/60 | Merker | 260—448.2 |

MURRAY TILLMAN, *Primary Examiner.*

T. E. LEVOW, *Examiner.*